(12) United States Patent
Szczesuil

(10) Patent No.: US 7,977,261 B2
(45) Date of Patent: Jul. 12, 2011

(54) THERMAL BARRIER FABRIC

(75) Inventor: Stephen P. Szczesuil, Framingham, MA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 620 days.

(21) Appl. No.: 11/503,504

(22) Filed: Aug. 11, 2006

(65) Prior Publication Data

US 2010/0272972 A1  Oct. 28, 2010

(51) Int. Cl.
*B32B 5/26* (2006.01)
*B32B 27/04* (2006.01)

(52) U.S. Cl. .......... 442/381; 442/87; 442/132; 442/370; 442/378; 442/409; 428/316.6

(58) Field of Classification Search .................. 442/132, 442/370, 378, 381, 409, 87, 394, 395; 428/316.6
See application file for complete search history.

(56) References Cited

U.S. PATENT DOCUMENTS

| | | | |
|---|---|---|---|
| 4,034,417 A * | 7/1977 | Ellis | 2/81 |
| 4,181,993 A | 1/1980 | McDaniel | |
| 5,091,233 A * | 2/1992 | Kirby et al. | 428/69 |
| 5,271,980 A * | 12/1993 | Bell | 428/68 |
| 5,900,978 A | 5/1999 | Sagar et al. | |
| 5,931,334 A | 8/1999 | Sartore | |
| 6,857,238 B2 | 2/2005 | Alderman | |
| 6,992,028 B2 | 1/2006 | Thomaschefsky et al. | |
| 2004/0040087 A1 * | 3/2004 | Lack et al. | 5/413 AM |

FOREIGN PATENT DOCUMENTS

| | | | |
|---|---|---|---|
| AU | 200223219 | * | 5/2002 |
| CA | 0221828/2 | * | 6/1999 |
| WO | WO 99/35926 | * | 7/1999 |

* cited by examiner

*Primary Examiner* — Norca L Torres-Velazquez
(74) *Attorney, Agent, or Firm* — Vincent J. Ranucci; Roger C. Phillips

(57) ABSTRACT

A thermal barrier fabric includes an inner impermeable material layer, an outer impermeable material layer, a spacer material disposed between the inner and outer impermeable material layers, and a reflective layer of material disposed between the spacer and a selected one of the inner impermeable material layer and the outer impermeable material layer. The inner and outer impermeable material layers are bound to each other along portions thereof outboard of the spacer material and the reflective layer of material to define a closed compartment. The compartment is under a vacuum, such that the reflective layer of the fabric reflects thermal energy back toward the source thereof and the vacuum substantially prevents thermal energy transfer through the compartment.

5 Claims, 2 Drawing Sheets

THERMAL BARRIER FABRIC

STATEMENT OF GOVERNMENT INTEREST

The invention described herein may be manufactured and used by the U.S. Government for Governmental purposes without the payment of any royalty thereon.

BACKGROUND OF THE INVENTION

1. Field of the Invention

The invention relates to fabric for use as a thermal barrier, as in protective clothing, and is directed more particularly to fabric for garments for conserving body heat of a wearer exposed to a cold environment, such as frigid air or water, or for protecting a wearer against exposure to severe heat or cold, and for use in other enclosures requiring thermal obstruction.

2. Description of the Prior Art

It is known to provide garments for the protection of wearers against elements which can be injurious to the wearer's well-being. One approach is to use materials which are of a thickness providing protection to the wearer against cold air. Such garments typically are extremely bulky and heavy. While providing protection from the elements, such garments are difficult to work in because of the bulkiness of the garment.

Another approach is to provide garments having heating (or cooling) elements therein. Garments of this type require an outside source of heating or cooling medium, or electrical power if electrical heating elements are utilized.

Neither of the above approaches is suitable for cold water exposure. In such instances, "wet suits", of neoprene, or the like, are generally worn and serve simply to keep water away from contact with the skin of the wearer.

There is thus a need for a light-weight, relatively non-bulky fabric from which garments can be made for protection of wearers against cold air and cold water, and from which thermally protective enclosures can be made for protection of people and/or goods.

SUMMARY OF THE INVENTION

An object of the invention is, therefore, to provide a light-weight, non-bulky, material for thermally protective garments.

A further object of the invention is to provide such a material as requires no outside medium introduced thereinto to provide protection against the elements.

A still further object of the invention is to provide such garment material as is sufficiently thin to be worn in water without unduly restricting the freedom of movement of the wearer.

A still further object is to provide such a material for other enclosures, such as bags, pouches, boxes, and the like, for thermally shielding the contents thereof.

With the above and other objects in view, a feature of the present invention is the provision of a garment fabric for conservation of body heat of a wearer, the fabric comprising an inner impermeable material layer, an outer impermeable material layer, a spacer material disposed between the inner and outer impermeable material layers, and a reflective foil layer of material disposed between the spacer and a selected one of the inner impermeable material layer and the outer impermeable material layer. The inner and outer impermeable material layers are bound to each other along portions thereof outboard of the spacer material and the reflective foil layer of material to define a closed compartment which is under a vacuum. The foil of the garment fabric reflects body heat back toward a wearer of the garment and the vacuum substantially prevents heat transfer by reduction of heat conduction and convection through the compartment.

In accordance with a further feature of the invention, there is provided a heat barrier material for conservation of body heat of a wearer, the barrier comprising an inner impermeable material layer, an outer impermeable material layer, a spacer material disposed between the inner and outer impermeable material layers, and a reflective layer of material disposed between the spacer and a selected one of the inner impermeable material layer and the outer impermeable material layer, the inner and outer impermeable material layers being bound to each other along portions thereof outboard of the spacer material and the reflective layer of material to define a closed compartment. The compartment is adapted to be under a vacuum. The reflective layer of material reflects body heat back toward a wearer of the barrier material and the vacuum substantially prevents heat transfer through the compartment.

In accordance with a still further feature of the invention, there is provided a fabric for obstructing flow of heat therethrough toward a wearer of the fabric, the fabric comprising an inner impermeable material layer, an outer impermeable layer of non-melting material, a spacer material disposed between the inner and outer impermeable material layers, and a reflective layer of material disposed between the spacer and a selected one of the inner impermeable material layer and the outer impermeable material layer, the inner and outer impermeable material layers being bound to each other along portions thereof outboard of the spacer material and the reflective layer of material to define a closed compartment. The compartment is adapted to be under a vacuum. The reflective layer of material reflects heat back toward a source of heat and the vacuum substantially reduces heat transfer through the compartment toward the wearer.

In accordance with a still further feature of the invention, there is provided a thermal barrier fabric for enclosures, the fabric being adapted to provide thermal shielding of contents of an enclosure, the fabric comprising an inner impermeable material layer, an outer impermeable material layer, a spacer material disposed between the inner and outer impermeable material layer, and a reflective layer of material disposed between the spacer and a selected one of the inner impermeable material layer and the outer impermeable material layers, the inner and outer impermeable material layers being bound to each other along portions thereof outboard of the spacer material and the reflective layer of material to define a closed compartment, wherein the compartment is adapted to be under a vacuum, whereby the reflective layer of material reflects thermal energy back toward a source thereof and the vacuum substantially prevents thermal energy transfer through the compartment.

The above and other features of the invention, including various novel details of construction and combinations of parts, will now be more particularly described with reference to the accompanying drawings and pointed out in the claims. It will be understood that the particular garment material embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
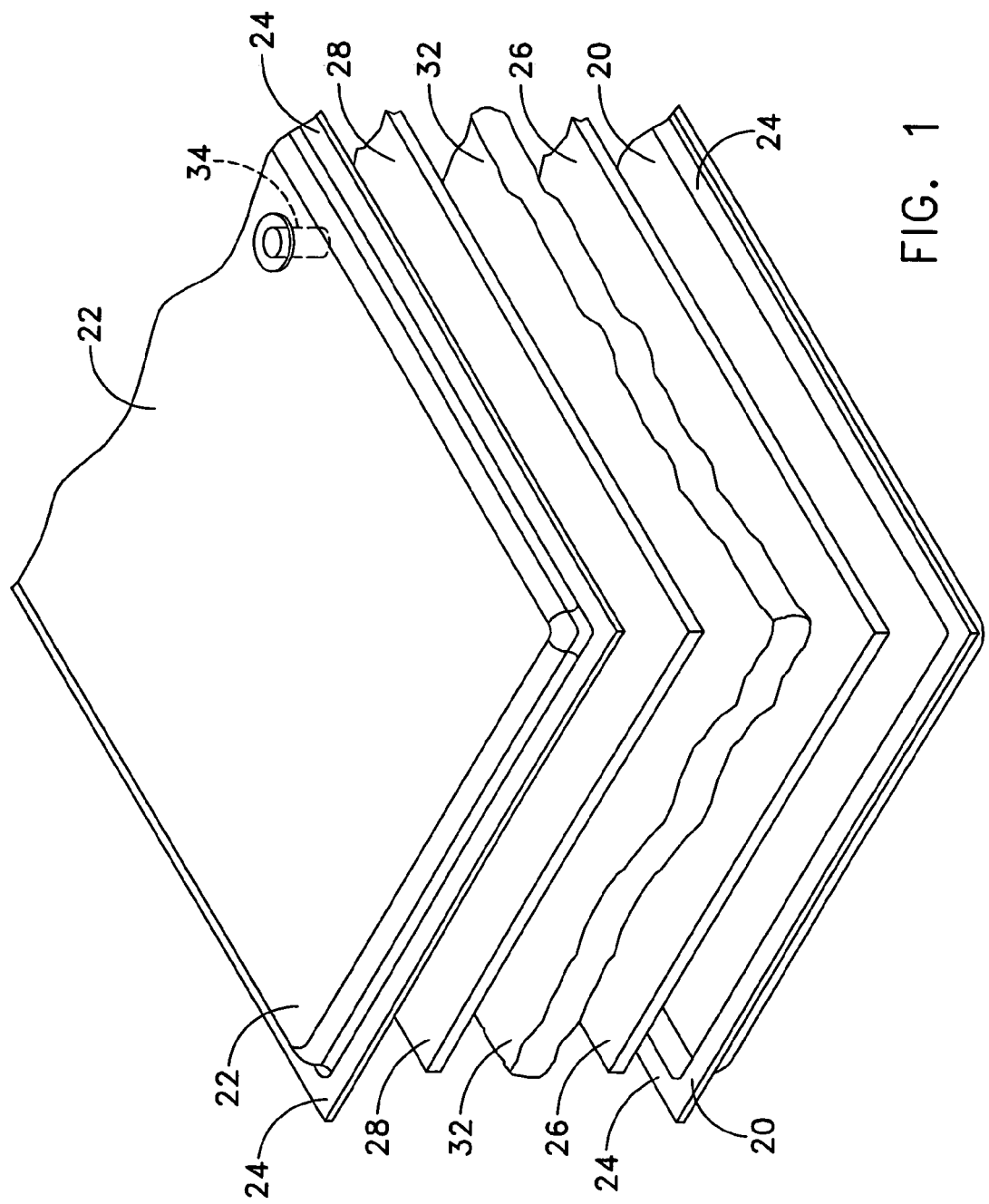
FIG. 1 is a diagrammatic perspective and exploded view of one form of thermal barrier fabric illustrative of an embodiment of the invention.

Referring to the drawings, it will be seen that an illustrative fabric for conservation of body heat of a wearer includes an inner impermeable material layer 20 and an outer impermeable material layer 22. The inner and outer material layers 20, 22 are preferably of a polymer material, a fusible silicon, or other impermeable material coated with an adhesive in the areas 24 in which the inner and outer material layers are joined to each other. Alternatively, the inner and outer layers 20, 22 may be of a woven, knit or non-woven cloth material coated with a polymer material or a fusible silicone to render the inner and outer layers impermeable.

The inner and outer layers 20, 22 are bound to each other in a stitchless manner in the areas 24, as by fusion, heat sealing, ultrasonic sealing, laser sealing, adhesive sealing, or the like. The cloth inner and outer layers 20, 22 are preferred for non-water environments.

Adjacent at least one of the impermeable material layers 20, 22, and preferably though not necessarily, adjacent each of the impermeable material layers, is a reflective foil layer 26, 28. The foil layer or layers 26, 28 are of reflective material, such as mylar, metal foil, or the like.

Figure 2:
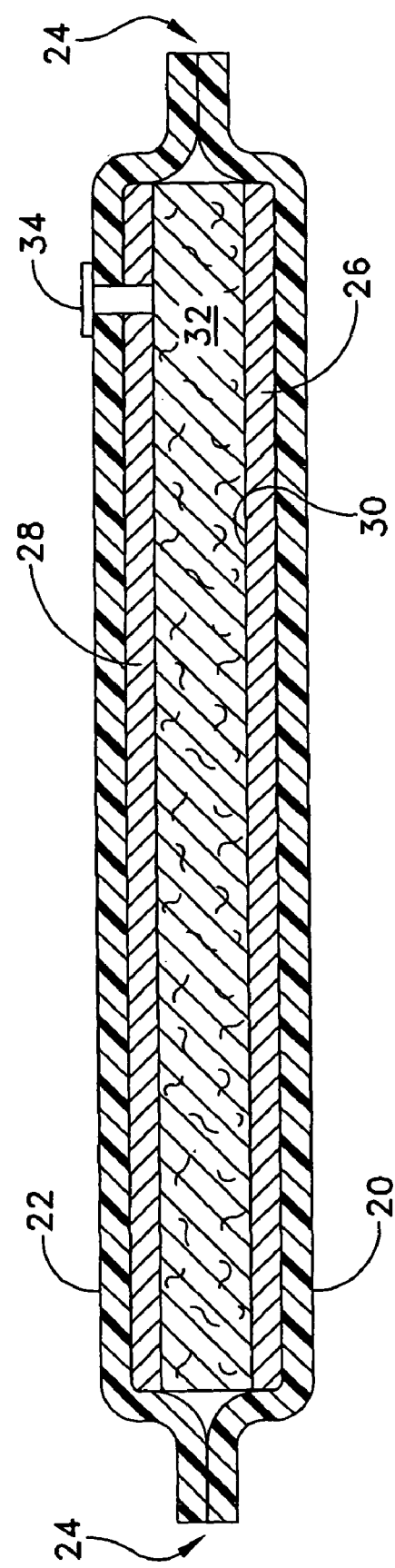
FIG. 2 is a diagrammatic sectional view of the fabric of FIG. 1, with the various layers of material shown assembled (not to scale).

Between the two reflective foil layers 26, 28, or if only one reflective layer is used, between that layer and the opposed impermeable layer, there is formed a compartment 30 (FIG. 2) in which there is disposed a layer of spacer material 32. The spacer material 32 is of greater thickness than all of the other layers combined. The spacer material 32 may be of a mesh or foam construction so as to be low in weight and very flexible, but of sufficient strength to resist compression and to maintain integrity of the compartment 30 by separation of the reflective foil layers 26, 28 forming the compartment 30 housing the spacer layer 32.

Thus, the spacer 32 and reflective foil layer or layers 26, 28 are retained in abutting relationship, but are not otherwise bound to each other.

The thickness of the entire assembly of layers depends principally upon the thickness of the selected spacer 32, the remaining layers all being of thicknesses which are so slight (about 0.001-0.003 inch) as to not affect weight and flexibility in an appreciable manner. The spacer layer preferably is about 0.25, or greater, inch in thickness and, because of its mesh structure defines a mostly void volume. For use in water, the thinner spacer thickness (0.25 inch) is preferred.

The compartment 30 may be provided with a valve 34 for the selective drawing of a vacuum in the compartment or terminating the vacuum in the compartment. The valve 34 prevents surrounding air from entering the compartment 30, the valve separating the internal vacuum from surrounding environment air pressure.

In operation, body heat passing through the inner layer 20 encounters the foil layer 26 which reflects heat back to the wearer. Heat not reflected by the foil layer 26 proceeds into the compartment 30 which is under vacuum, and which greatly reduces, or stops, escape by conduction and/or convection of body heat. Any body heat getting through the vacuum encounters the foil layer 28, which reflects the heat back toward the wearer's body. However, the inwardly-reflected heat is unable to move through the vacuum and past the reflective layer 26 and therefore substantially remains in the compartment 30.

In an alternative embodiment, the garment material described hereinabove may be used for obstructing heat flow therethrough and providing protection against extreme heat sources, such as blast furnaces, fires, and the like, by providing a layer of a non-melting fiber material in place of the outer material layer 22. The non-melting fiber material may be of Kevlar®, or Nomex®, or similar material.

There is thus provided a fabric for use in protective garments, the fabric being of light weight and non-bulky material, and effective to prevent flow of heat therethrough.

While the fabric presented herein is discussed above with respect to protective clothing, it will be apparent that the same construction applies to heat barrier materials for use in containers for hot or cold foodstuffs, sleeping bags, sleeping bag mats, headwear, footwear soles, and other containers or enclosures containing matter or contents requiring shielding from thermal elements.

It is to be understood that the present invention is by no means limited to the particular construction herein disclosed and/or shown in the drawings, but also comprises any modification or equivalent within the scope of the claims.

What is claimed is:

1. A garment fabric for conservation of body heat of a wearer, the fabric comprising:

an inner impermeable material layer of material for disposition, in use, adjacent the body of the wearer;

an outer impermeable material layer of material substantially co-extensive with said inner layer and spaced therefrom;

a spacer material disposed between and inwardly of edges of said inner and outer impermeable material layers, said spacer material, being of a selected one of a foam and a mesh and defining a mostly void volume; and a reflective layer of foil material disposed between said spacer material and a selected one of said inner impermeable material layer and said outer impermeable material layer;

a second reflective layer of material disposed between said spacer material and the other of said inner impermeable material layer and said outer impermeable material layer;

said inner and outer impermeable material layers including at least one layer comprising a cloth material coated with a fusible silicone;

said inner and outer impermeable material layers being bound to each other by ultrasonic sealing and only along portions thereof outboard of said spacer material and said reflective layer of material to define a closed compartment solely containing said reflective layer of foil material, said second reflective layer and said spacer material, each of which being retained within said closed compartment by said inner and outer impermeable layers and each of which being in abutting, unfixed relationship and not otherwise bound to any of each other;

the compartment being under a vacuum and the compartment having a valve for drawing the vacuum in the compartment;

said spacer material having a thickness greater than a thickness of a combination of all layers comprising said inner and outer impermeable layers and reflective layer;

said spacer material being disposed in the compartment and having a strength for resisting compression and for maintaining integrity of the compartment by separating the layers forming the compartment;

whereby said reflective layer of material reflects body heat back toward a wearer of the garment and the second reflective layer of material and the vacuum substantially prevents heat transfer through the compartment.

2. The garment fabric in accordance with claim 1 wherein said inner and outer impermeable layers are each of a selected one of a fusible silicone, and an adhesive coated material.

3. The garment fabric in accordance with claim 1 wherein each of said reflective layer and said second reflective layer consists of a polyester film.

4. The garment fabric in accordance with claim 1 wherein said spacer material provides sufficient resistance to compression to maintain separation between said reflective layers.

5. The garment fabric in accordance with claim 1 wherein said spacer material is of a thickness of at least about 0.25 inch.

\* \* \* \* \*